United States Patent
Chalmers et al.

(10) Patent No.: US 11,804,113 B1
(45) Date of Patent: Oct. 31, 2023

(54) VISUAL INDICATION OF AUDIBILITY

(71) Applicant: Apple Inc., Cupertino, CA (US)

(72) Inventors: Devin William Chalmers, Oakland, CA (US); Dhruv Aditya Govil, San Mateo, CA (US); Rahul Nair, Santa Clara, CA (US)

(73) Assignee: APPLE INC., Cupertino, CA (US)

(*) Notice: Subject to any disclaimer, the term of this patent is extended or adjusted under 35 U.S.C. 154(b) by 223 days.

(21) Appl. No.: 17/387,139

(22) Filed: Jul. 28, 2021

Related U.S. Application Data

(60) Provisional application No. 63/072,198, filed on Aug. 30, 2020.

(51) Int. Cl.
| G08B 5/22 | (2006.01) |
| G10L 25/78 | (2013.01) |
| G08B 1/08 | (2006.01) |
| G06V 20/00 | (2022.01) |

(52) U.S. Cl.
CPC .............. *G08B 5/22* (2013.01); *G06V 20/00* (2022.01); *G08B 1/08* (2013.01); *G10L 25/78* (2013.01)

(58) Field of Classification Search
CPC ....................................................... G08B 5/22
See application file for complete search history.

(56) References Cited

U.S. PATENT DOCUMENTS

| 10,176,820 B2 | 1/2019 | Muehlhausen et al. |
| 10,178,492 B2 | 1/2019 | Popova |
| 10,271,729 B2 | 4/2019 | Greiner et al. |
| 2007/0286386 A1* | 12/2007 | Denenberg .......... H04M 3/4872 379/202.01 |
| 2015/0110277 A1* | 4/2015 | Pidgeon ................. H04R 3/00 381/56 |
| 2016/0165372 A1* | 6/2016 | Weksler ............... H04M 1/724 381/56 |
| 2021/0392451 A1* | 12/2021 | Lee ...................... H04R 29/001 |
| 2022/0159813 A1* | 5/2022 | Justin ...................... H04R 1/08 |

FOREIGN PATENT DOCUMENTS

| CA | 2791034 A1 * | 6/2013 | ............ H04M 3/569 |
| WO | 2012144887 A1 | 10/2012 | |
| WO | WO-2022051097 A1 * | 3/2022 | |

* cited by examiner

*Primary Examiner* — Olisa Anwah
(74) *Attorney, Agent, or Firm* — Fernando & Partners, LLP

(57) ABSTRACT

Various implementations disclosed herein include devices, systems, and methods for displaying a visual indication of audibility of an audible signal. In various implementations, a device includes a display, an audio sensor, a processor and a non-transitory memory. In various implementations, a method includes receiving, via the audio sensor, an audible signal and converting the audible signal to electronic signal data. In various implementations, the method includes obtaining environmental data that indicates audio response characteristics of a physical environment in which the device is located. In various implementations, the method includes displaying, on the display, an indicator that indicates a distance from a source of the audible signal at which the audible signal is audible. In some implementations, the distance is based on an amplitude associated with the electronic signal data and the audio response characteristics of the physical environment.

25 Claims, 9 Drawing Sheets

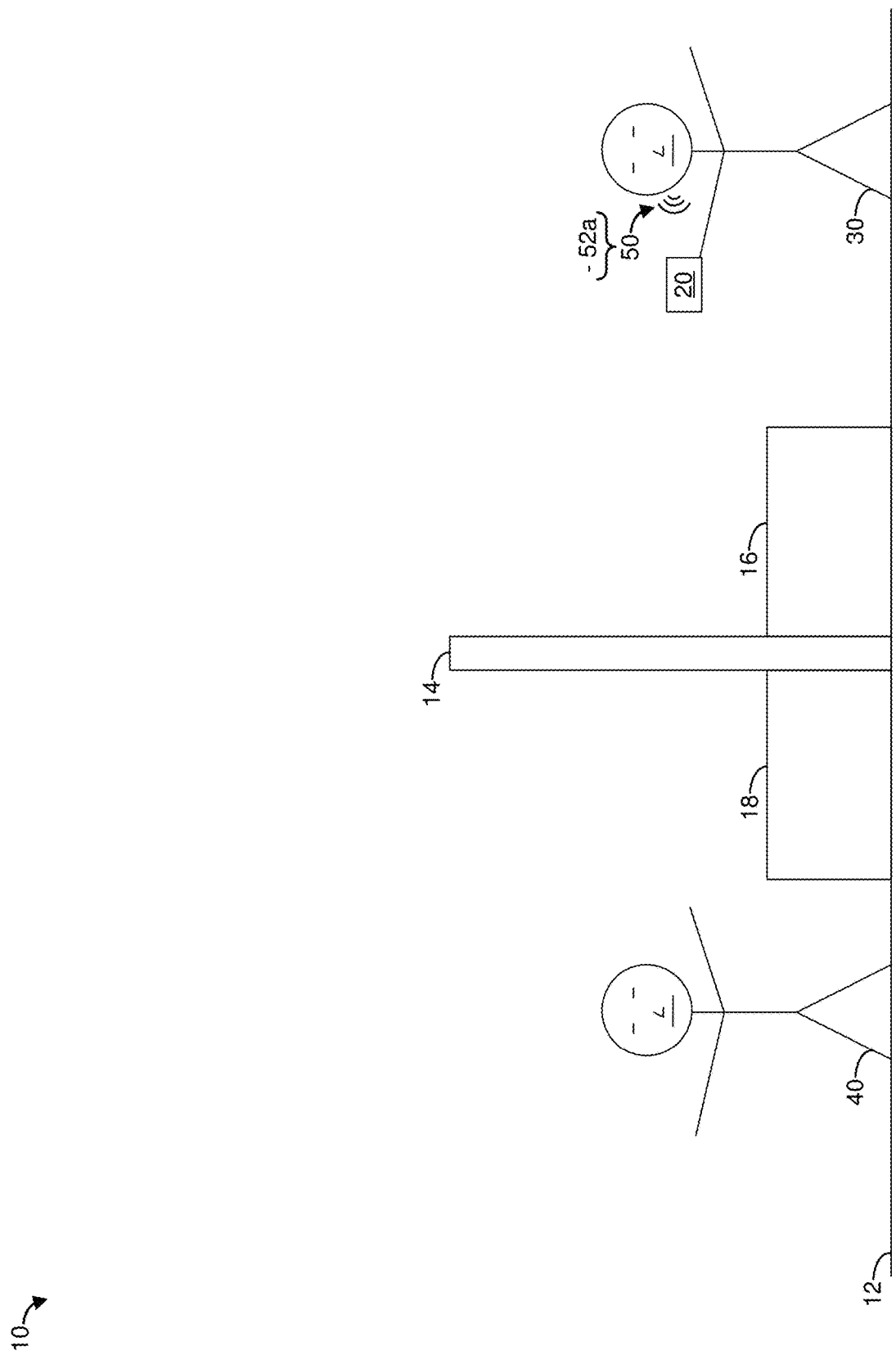

VISUAL INDICATION OF AUDIBILITY

CROSS-REFERENCE TO RELATED APPLICATION

This application claims the benefit of U.S. Provisional Patent App. No. 63/072,198, filed on Aug. 30, 2020, which is incorporated by reference in its entirety.

TECHNICAL FIELD

The present disclosure generally relates to displaying a visual indication of audibility of an audible signal.

BACKGROUND

Some devices are capable of generating and presenting extended reality (XR) environments. Some XR environments include virtual environments that are simulated replacements of physical environments. Some XR environments include augmented environments that are modified versions of physical environments. Some devices that present XR environments include mobile communication devices such as smartphones, tablets, head-mountable displays (HMDs), eyeglasses, heads-up displays (HUDs), and optical projection systems.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1E are diagrams of an example operating environment in accordance with some implementations.

Figure 1B:
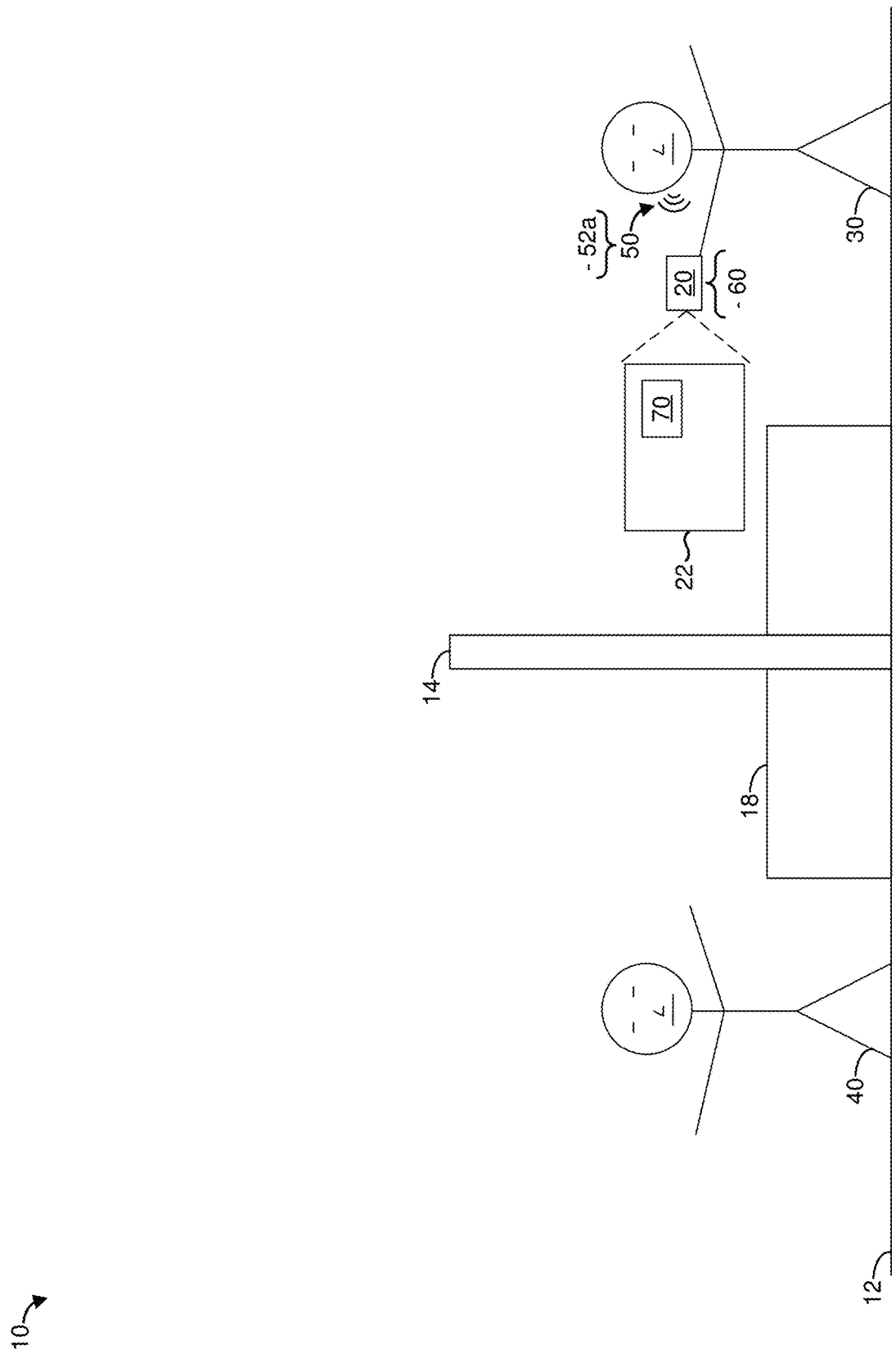

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying a visual indication of audibility of an audible signal. In various implementations, a device includes a display, an audio sensor, a processor and a non-transitory memory. In various implementations, a method includes receiving, via the audio sensor, an audible signal and converting the audible signal to electronic signal data. In various implementations, the method includes obtaining environmental data that indicates audio response characteristics of a physical environment in which the device is located. In various implementations, the method includes displaying, on the display, an indicator that indicates a distance from a source of the audible signal at which the audible signal is audible. In some implementations, the distance is based on an amplitude associated with the electronic signal data and the audio response characteristics of the physical environment.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Sometimes a user of a device is not aware of how far the user's voice is carrying in a physical environment surrounding the device. For example, if the user is having a phone conversation, the user may not be aware that the user is talking too loudly and disturbing other people in the physical environment. Similarly, if the user is having an in-person conversation with another person, the user may not aware of whether the user is speaking loud enough to be heard by the other person but not loud enough to disturb other people that are not part of the conversation. For example, if the user is having an in-person conversation with a coworker in an open office setting, then the user may not be aware of how far the user's voice is carrying and disturbing other coworkers that are not part of the conversation. In another example, if the user is failing at activating a voice-activated device, the user may not realize that the user is not speaking loud enough for the user's voice to be detected by the voice-activated device.

The present disclosure provides methods, systems, and/or devices for displaying a visual indication of audibility of an audible signal. A device displays an indicator that indicates a distance at which an audible signal is audible. The device determines the distance based on an audio characteristic of the audible signal and audio response characteristics of a physical environment in which the device is located. The audio response characteristics indicate how an audible signal propagates through the physical environment. The audio response characteristics can be a function of physical obstructions in the physical environment. The audio response characteristics can be a function of materials used in the physical environment. For example, how an audible signal propagates through the physical environment can be a function of sound absorption characteristics or sound reflection characteristics of the materials in the physical environment.

Displaying the indicator enhances a functionality of the device by allowing the user to be more aware of how far an audible signal is propagating in the physical environment. Displaying the indicator improves operability of the device by allowing the user to control an amplitude of the audible signal with more certainty and precision. For example, if the audible signal is being generated by the device and the indicator indicates that the audible signal is audible in a particular area of the physical environment (e.g., in a sleeping child's bedroom), the user can provide a user input to adjust an amplitude of the audible signal until the indicator indicates that the audible signal is not audible in that particular area of the physical environment. Displaying the indicator likely reduces a number of user inputs corresponding to adjusting an amplitude of the audible signal. For example, in the absence of the indicator the user may need to alternate between going to the child's bedroom and adjusting the amplitude of the audible signal until the audible signal is not audible in the child's bedroom. As such, displaying the indicator tends to reduce a number of user inputs corresponding to adjusting an amplitude of an audible signal. Reducing a number of unnecessary user inputs tends to prolong a battery life of a battery-powered device thereby enhancing operability of the device.

FIG. 1A is a diagram of an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a floor 12, a room divider 14 (e.g., an office partition), a first office desk 16, a second office desk 18, an electronic device 20, a user 30 of the electronic device 20, and a person 40.

In some implementations, the electronic device 20 includes a handheld computing device that can be held by the user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

Figure 4A:
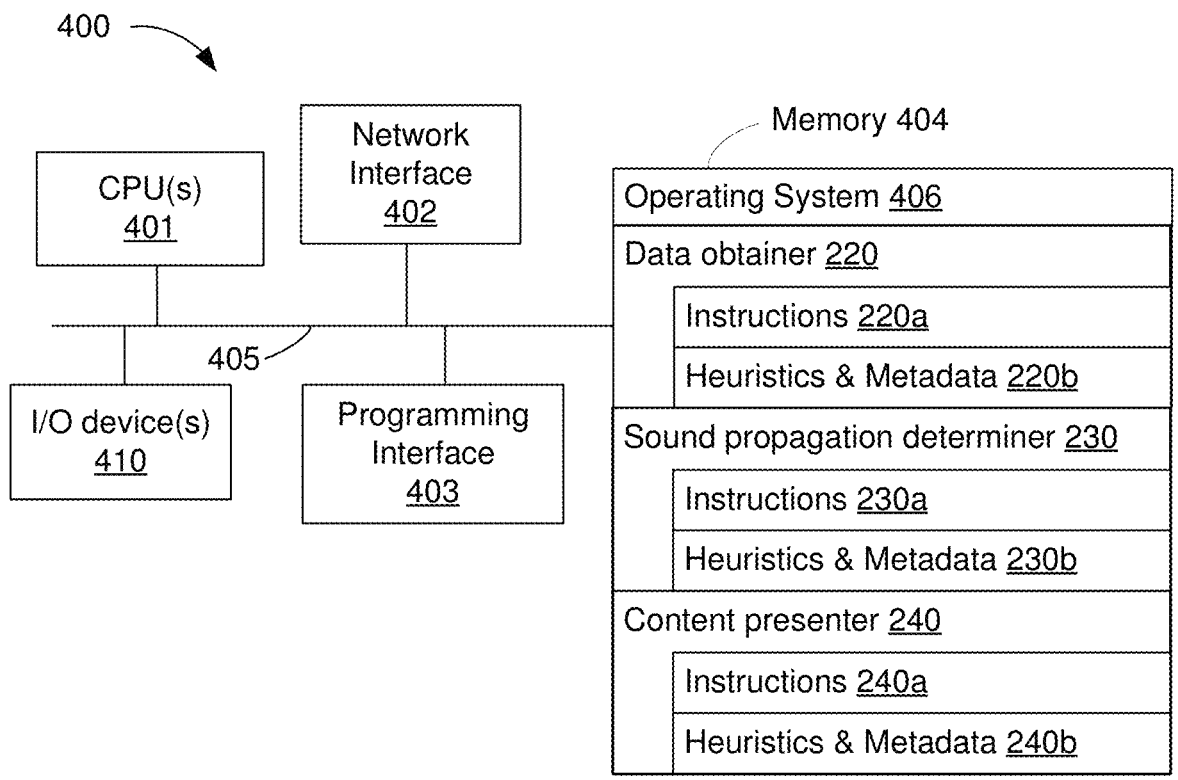
FIG. 4A is a block diagram of a device that displays a visual indication of audibility in accordance with some implementations.
Figure 4B:
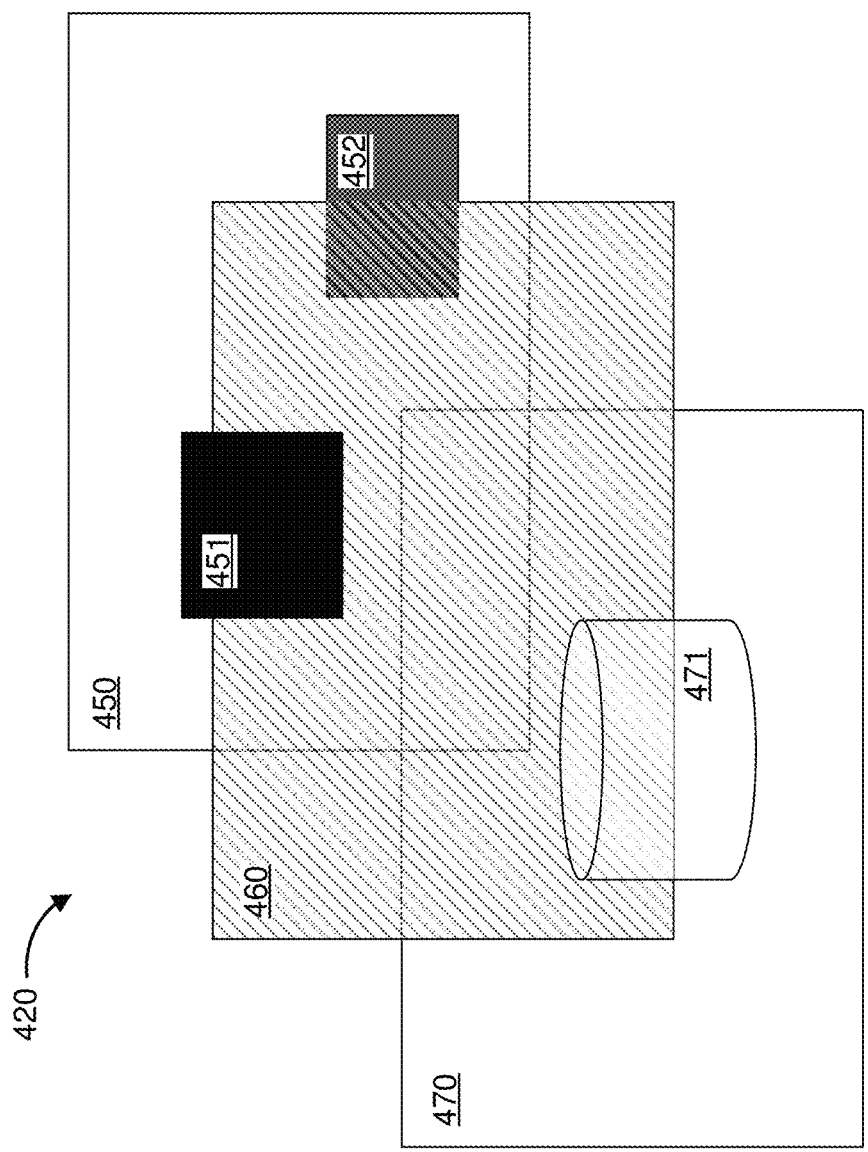
FIG. 4B is a blow-up view of an optical see-through display in accordance with some implementations.

In some implementations, the electronic device 20 includes an optical see-through display (e.g., the optical see-through display 420 shown in FIG. 4B). For example, the electronic device 20 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

As illustrated in FIG. 1A, in various implementations, the electronic device 20 detects an audible signal 50. In some implementations, the audible signal 50 is characterized by a first audio characteristic value 52a (e.g., a first amplitude value). In some implementations, the audible signal 50 is an utterance by a person. For example, in some implementations, the audible signal 50 is an utterance by the user 30. Alternatively, in some implementations, the audible signal 50 is generated by a device. For example, in some implementations, the audible signal 50 is generated by the electronic device 20. In some implementations, the audible signal 50 is generated by another device such as a television, a speaker, a voice-activated device, etc.

Referring to FIG. 1B, in various implementations, the electronic device 20 obtains environmental data 60 that indicates audio response characteristics of the physical environment 10. In some implementations, the environmental data 60 indicates physical obstructions in the physical environment 10. For example, in some implementations, the environmental data 60 indicates a location and physical dimensions of the room divider 14. In some implementations, the electronic device 20 includes an image sensor (e.g., a camera), and the electronic device 20 obtains the environmental data 60 by capturing an image of the physical environment 10 with the image sensor. In such implementations, the electronic device 20 performs scene analysis on the captured image to identify the location and the physical dimensions of the physical obstructions in the physical environment 10. In some implementations, the electronic device 20 includes a depth sensor (e.g., a depth camera), and the electronic device 20 obtains the environmental data 60 by capturing depth data via the depth sensor. In such implementations, the depth data indicates the location and the physical dimensions of the physical obstructions in the physical environment 10.

In some implementations, the environmental data 60 indicates materials that are used in the physical environment 10. For example, in some implementations, the environmental data 60 indicates whether the floor 12 is carpeted, wooden or tiled. In some implementations, the environmental data 60 includes an image of the physical environment 10, and the electronic device 20 determines the materials that are used in the physical environment 10 by performing a scene analysis on the image.

In some implementations, the environmental data 60 indicates sound absorption characteristics or sound reflection characteristics of various objects in the physical environment 10. In some implementations, the environmental data 60 indicates a sound transmission class (STC) rating or a noise reduction coefficient (NRC) of a physical object in the physical environment 10. For example, in some implementations, the environmental data 60 indicates an STC rating or an NRC for the room divider 14. In some implementations, the environmental data 60 includes an image of the physical environment 10. In such implementations, the electronic device 20 identifies the material composition of a physical object in the physical environment 10 by performing scene analysis on the image. After identifying the material composition of the physical object, the electronic device 20 retrieves the STC rating or the NRC for the material that the physical object is composed of.

In various implementations, the electronic device 20 determines a distance at which the audible signal 50 is audible in the physical environment 10 based on the first audio characteristic value 52a of the audible signal 50 and the audio response characteristics of the physical environment 10 indicated by the environmental data 60. As illustrated in FIG. 1B, in some implementations, the electronic device 20 displays an indicator 70 on a display 22 of the electronic device 20 to indicate the distance.

Figure 1C:
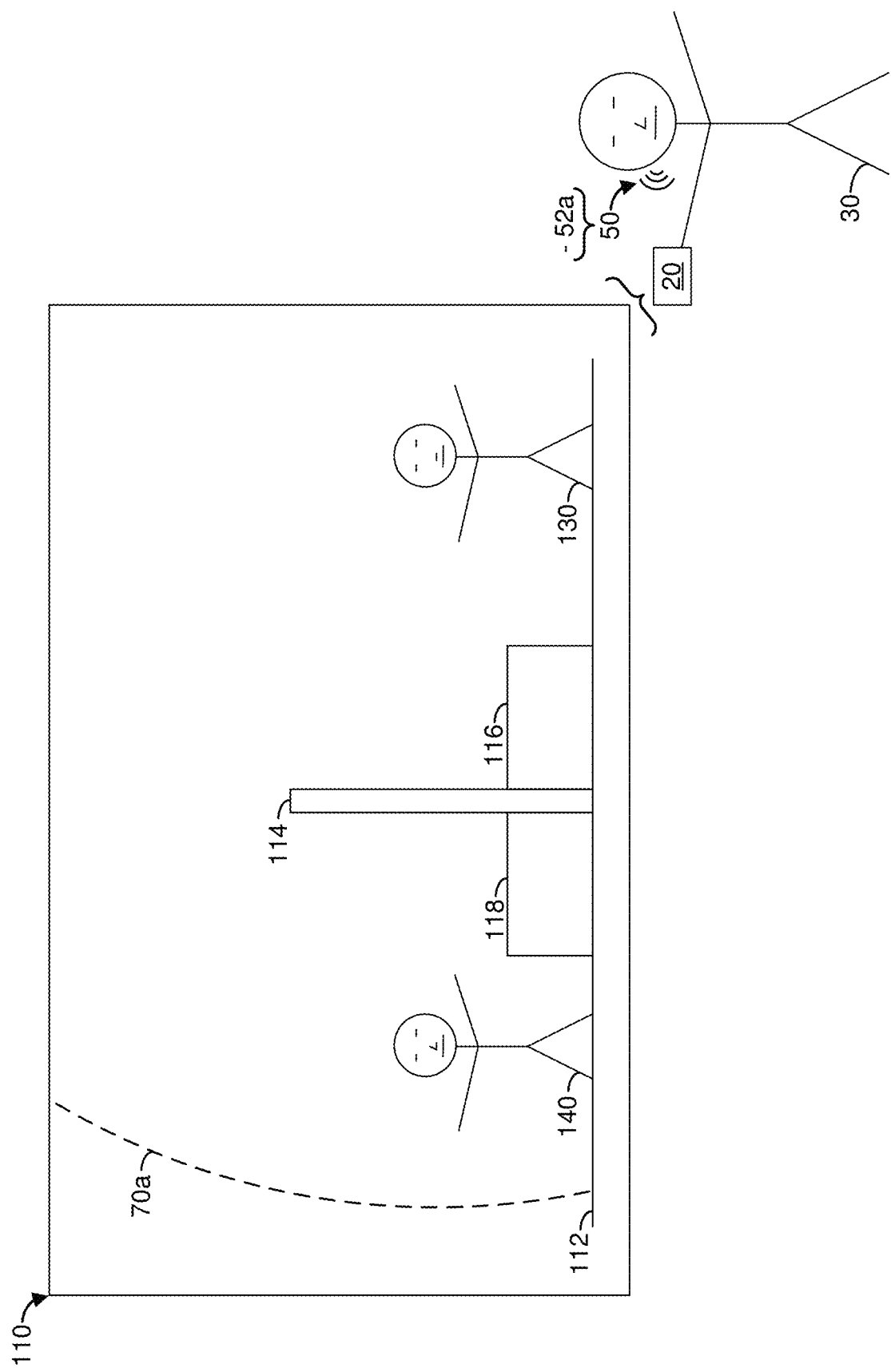

Referring to FIG. 1C, in some implementations, the electronic device 20 presents an XR environment 110 that corresponds to (e.g., represents) the physical environment 10 shown in FIGS. 1A and 1B. To that effect, the XR environment 110 includes an XR representation 112 of the floor 12 ("XR floor 112", hereinafter for the sake of brevity), an XR representation 114 of the room divider 14 (e.g., "XR room divider 114", hereinafter for the sake of brevity), an XR representation 116 of the first office desk 16 ("first XR office desk 116", hereinafter for the sake of brevity), an XR representation 118 of the second office desk 18 ("second XR office desk 118", hereinafter for the sake of brevity), an XR representation 130 of the user 30 ("XR user 130", hereinafter for the sake of brevity), and an XR representation 140 of the person 40 ("XR person 140", hereinafter for the sake of brevity).

In some implementations, the XR environment 110 is a pass-through of the physical environment 10. For example, in some implementations, the electronic device 20 includes an optical see-through display, and the XR environment 110 is an optical pass-through of the physical environment 10. In some implementations, the electronic device 20 includes an opaque display, and the XR environment 110 is a video pass-through of the physical environment 10.

As illustrated in FIG. 1C, in some implementations, the XR environment 110 includes an indicator 70a that indicates a distance at which the audible signal 50 is audible. In some implementations, the indicator 70a is a three-dimensional (3D) geometric shape. In the example of FIG. 1C, the indicator 70a is an arc. In some implementations, the indicator 70a is sphere-shaped. For example, in some implementations, the arc is a portion of a sphere (not shown). In some implementations, the indicator 70a is in the shape of a bubble, and the audible signal 50 is audible inside the bubble and the audible signal 50 is inaudible outside the bubble. As can be seen in FIG. 1C, the indicator 70a encompasses the XR person 140 indicating that the audible signal 50 is audible at a location corresponding to the XR person 140. In other words, the XR person 140 can hear the audible signal 50 because the XR person 140 is on the concave side of the arc. Displaying the indicator 70a provides an indication to the user 30 that the person 40 can hear the audible signal 50. In the example of FIG. 1C, the audible signal 50 is audible on the concave side of the arc represented by the indicator 70a but not on the convex side of the arc represented by the indicator 70a.

Figure 1D:
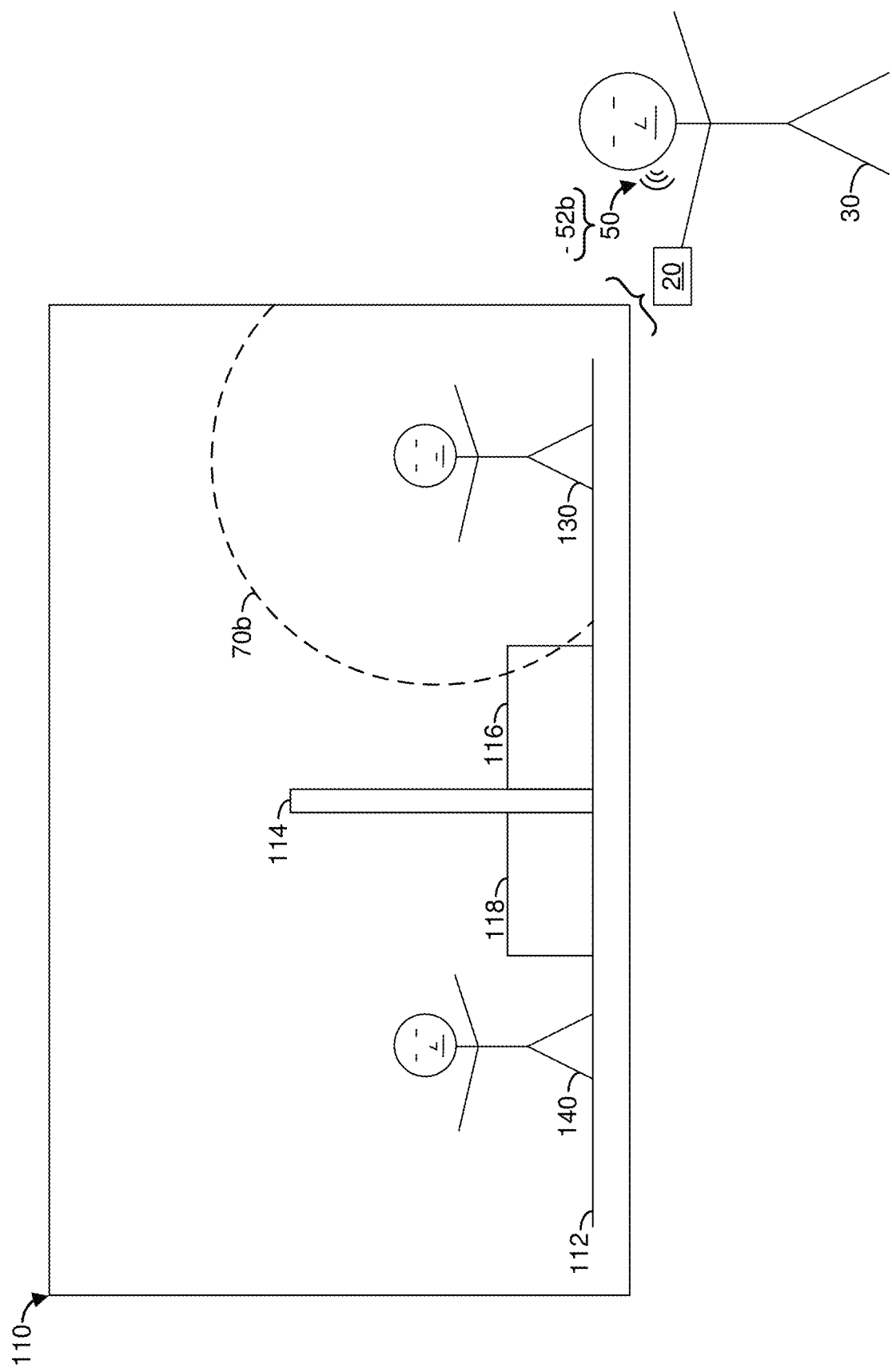

In the example of FIG. 1D, the audible signal 50 is associated with a second audio characteristic value 52b that is different from the first audio characteristic value 52a shown in FIG. 1C. In some implementations, the first audio characteristic value 52a shown in FIG. 1C represents a first amplitude value and the second audio characteristic value 52b represents a second amplitude value that is smaller than the first amplitude value. FIG. 1D illustrates an indicator 70b (e.g., an arc, for example, a portion of a sphere) that indicates how far the audible signal 50 is propagating in the physical environment 10. The indicator 70b indicates that, based on the second audio characteristic value 52b, the audible signal 50 is propagating from the user 30 to a location that corresponds to the indicator 70b. As shown in FIG. 1D, the XR person 140 is on the convex side of the arc represented by the indicator 70b. As such, in the example of FIG. 1D, the audible signal 50 in inaudible at a location corresponding to the person 40. In other words, given the second audio characteristic value 52b, the person 40 cannot hear the audible signal 50.

Figure 1E:
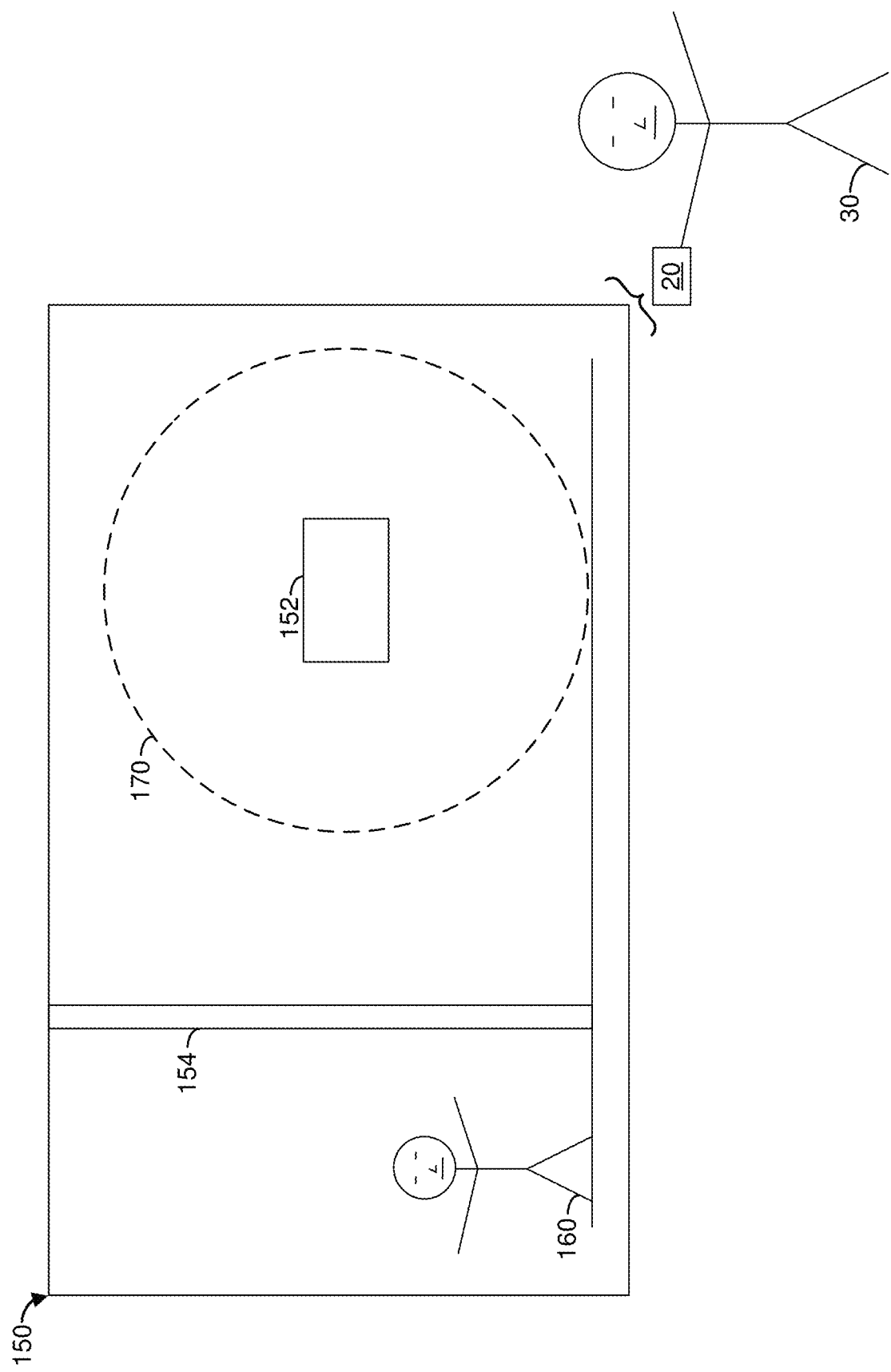

FIG. 1E illustrates an XR environment 150 that includes an XR television 152 (e.g., an XR representation of a physical television in a physical environment), an XR wall 154 (e.g., an XR representation of a physical wall in the physical environment), and an XR person 160 (e.g., an XR representation of a person in the physical environment). In the example of FIG. 1E, the electronic device 20 displays a bubble 170 that indicates how far an audible signal generated by the television can be heard. In various implementations, the audible signal generated by the television can be heard at locations that are inside the bubble 170 but not at locations that are outside the bubble 170. As such, the audible signal generated by the television cannot be heard by the person represented by the XR person 160.

If the user 30 wants to watch and listen to television without disturbing the person represented by the XR person 160, the user 30 can use the bubble 170 as a guide to set a volume of the television. For example, if the user 30 does not want the person represented by the XR person 160 to be disturbed by the sound of the television, the user 30 can set the volume of the television to a level that results in the XR person 160 being outside the bubble 170. In the example of FIG. 1E, the bubble 170 serves as a visual aide that allows the user 30 to listen to the television without disturbing the person represented by the XR person 160.

In some implementations, the electronic device 20 includes an HMD that is worn by the user 30. In some implementations, the HMD presents (e.g., displays) an XR environment (e.g., the XR environment 110 shown in FIGS. 1C and 1D, and/or the XR environment 150 shown in FIG. 1E) according to various implementations. In such implementations, the HMD displays the indicator 70 shown in FIG. 1B, the indicator 70a shown in FIG. 1C, the indicator 70b shown in FIG. 1D, and/or the bubble 170 shown in FIG. 1E. In some implementations, the HMD includes an integrated display (e.g., a built-in display, for example, a built-in optical see-through display or a built-in opaque display) that displays the XR environment including the indicator. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the XR environment including the indicator. In various implementations, examples of the electronic device 20 include smartphones, tablets, media players, laptops, etc.

Figure 2:
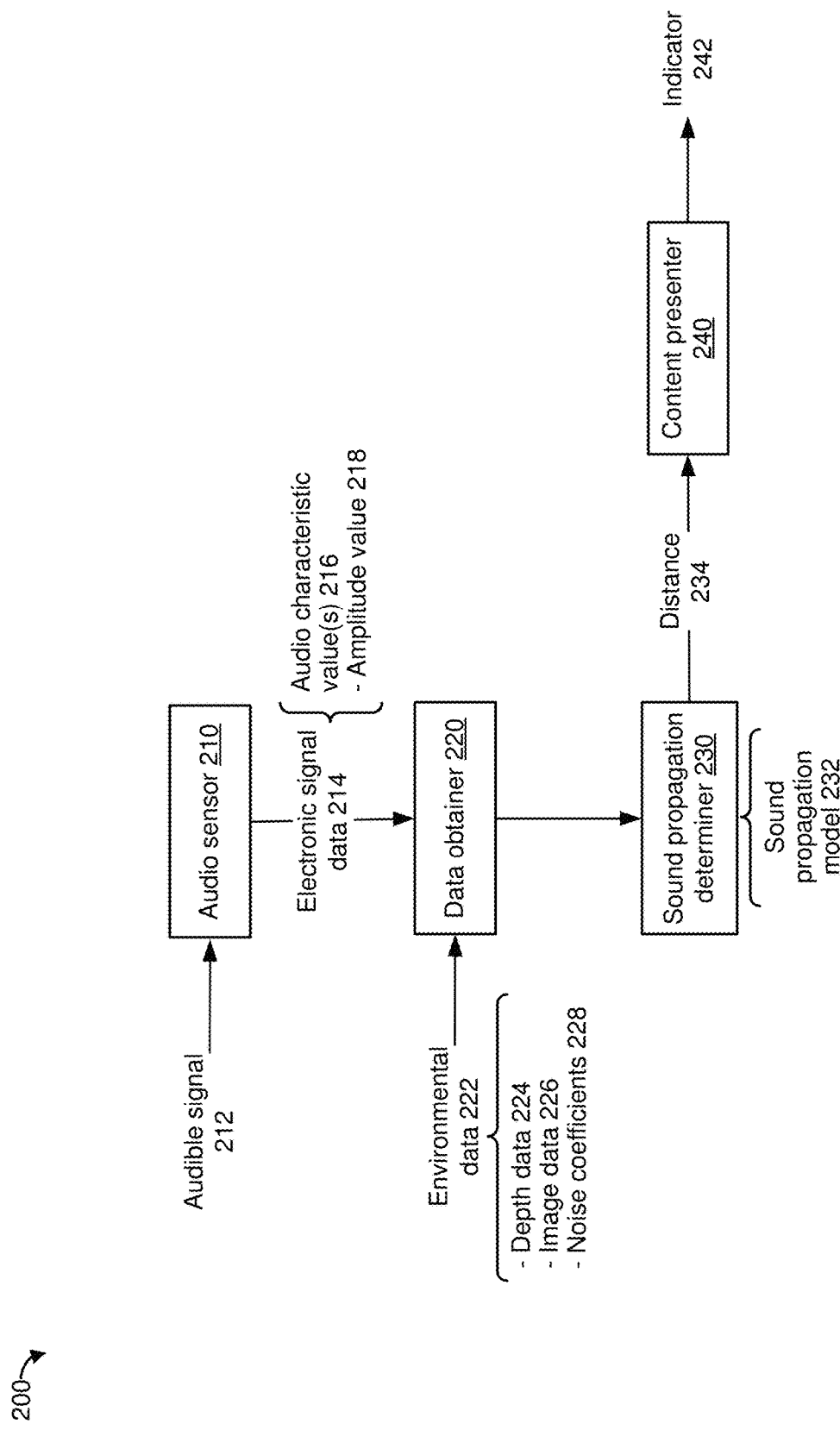
FIG. 2 is a block diagram of a system in accordance with some implementations.

FIG. 2 is a block diagram of a system 200 in accordance with some implementations. In some implementations, the system 200 resides at (e.g., is implemented by) the electronic device 20 shown in FIGS. 1A-1E. In some implementations, the electronic device 20 (shown in FIGS. 1A-1E) includes the system 200. In various implementations, the system 200 includes an audio sensor 210, a data obtainer 220, a sound propagation determiner 230 and a content presenter 240.

In various implementations, the audio sensor 210 receives an audible signal 212. For example, the audio sensor 210 detects the audible signal 50 shown in FIGS. 1A-1D. In some implementations, the audio sensor 210 includes a microphone. In various implementations, the system 200 (e.g., the audio sensor 210 or an audio processing unit) converts the audible signal 212 into electronic signal data 214. In various implementations, the electronic signal data 214 is associated with a set of one or more audio characteristic values 216 (e.g., the first audio characteristic value 52a shown in FIG. 1A or the second audio characteristic value 52b shown in FIG. 1D). For example, in some implementations, the electronic signal data 214 is associated with an amplitude value 218 that indicates an amplitude of the audible signal 212. Examples of the audio characteristic values 216 include a frequency value, location coordinate values indicating where the audible signal 212 is originating from, and a source type value indicating a source of the audible signal 212. In various implementations, the audio sensor 210 provides the electronic signal data 214 to the data obtainer 220.

In various implementations, the data obtainer 220 obtains environmental data 222 (e.g., the environmental data 60 shown in FIG. 1B). In some implementations, the environmental data 222 includes depth data 224 that is captured by a depth sensor (e.g., a depth camera). In some implementations, the environmental data 222 includes image data 226 (e.g., a set of one or more images) that is captured by an image sensor (e.g., a camera). In some implementations, the environmental data 222 includes noise coefficients 228 (e.g., STC ratings or NRCs for various materials and/or objects in a physical environment) that indicate sound absorption or reflectiveness properties of objects in the physical environment.

In various implementations, the sound propagation determiner 230 determines (e.g., estimates) a distance 234 at which the audible signal 212 is audible based on the audio characteristic values(s) 216 associated with the electronic signal data 214 and the environmental data 222. In some implementations, the distance 234 is measured from a source of the audible signal 212. For example, in FIGS. 1A-1D, the distance 234 is measured from the user 30 because the user 30 is the source of the audible signal 50. However, in FIG. 1E, the distance is measured from the television represented by the XR television 152 because the television is the source of the audible signal.

In various implementations, the sound propagation determiner 230 utilizes a sound propagation model 232 to determine the distance 234. In some implementations, the system 200 (e.g., the sound propagation determiner 230) synthesizes the sound propagation model 232 based on the environmental data 222. For example, in some implementations, the sound propagation determiner 230 identifies locations and physical dimensions of obstructions in the physical environment based on the depth data 224 and/or the image data 226. In such implementations, the sound propagation model 232 models how an audible signal is reflected and/or absorbed by the obstructions in the physical environment. In some implementations, the sound propagation model 232 utilizes the noise coefficients 228 to determine the propagation trajectory of an audible signal through the physical environment.

In various implementations, the content presenter 240 obtains a value representing the distance 234 from the sound propagation determiner 230, and displays an indicator 242 to indicate the distance 234. For example, the content presenter 240 displays the indicator 70 shown in FIG. 1B, the indicator 70a shown in FIG. 1C, the indicator 70b shown in FIG. 1D and/or the bubble 170 shown in FIG. 1E. In some implementations, the content presenter 240 displays an XR environment (e.g., the XR environment 110 shown in FIGS. 1C and 1D, and/or the XR environment 150 shown in FIG. 1E), and the content presenter 240 displays the indicator 242 within the XR environment.

Figure 3:
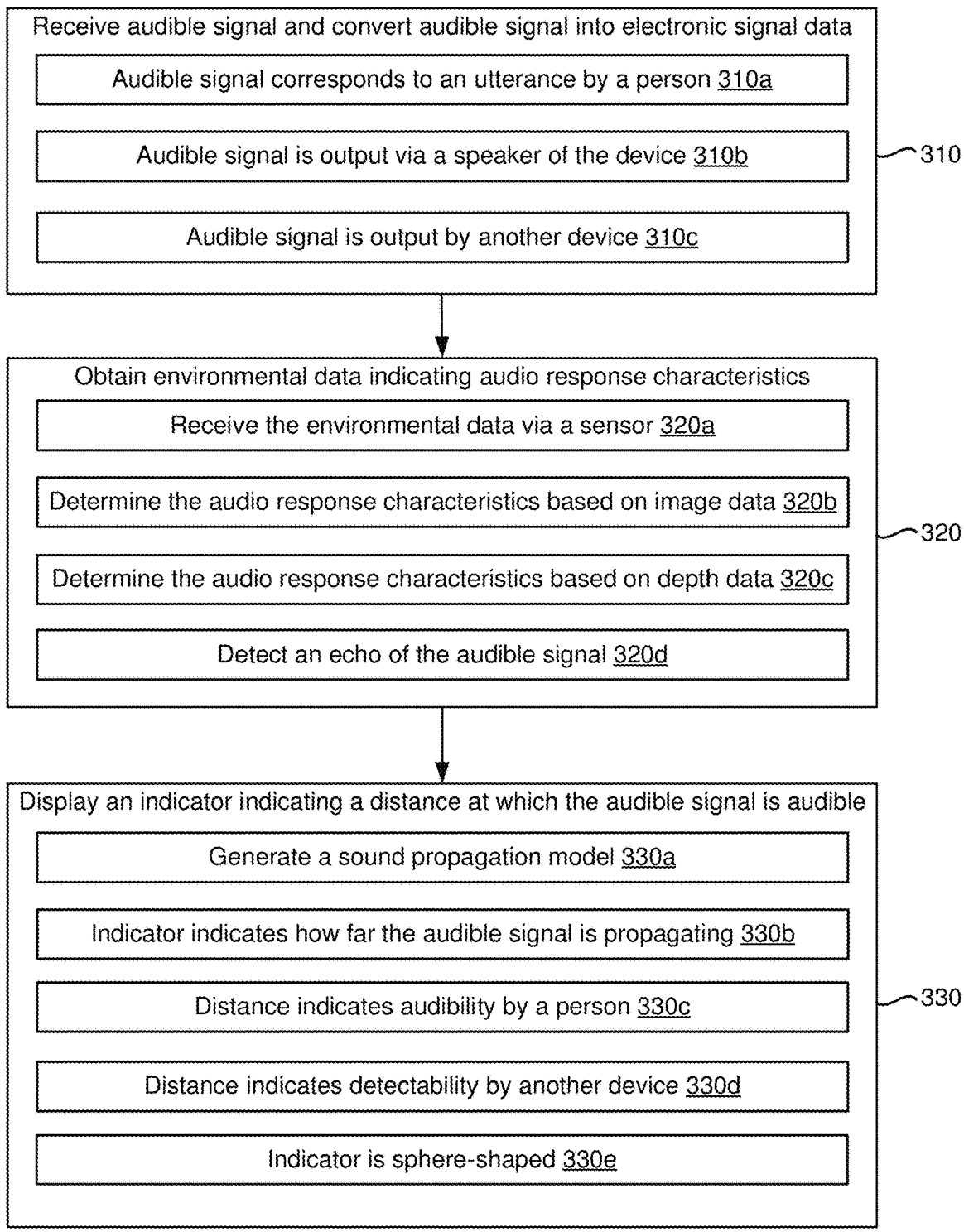
FIG. 3 is a flowchart representation of a method of displaying a visual indication of audibility in accordance with some implementations.

FIG. 3 is a flowchart representation of a method 300 of displaying a visual indication of audibility for an audible signal. In various implementations, the method 300 is performed by a device with a display (e.g., an optical see-through display, for example, the optical see-through display 420 shown in FIG. 4B), an audio sensor (e.g., a microphone), a non-transitory memory, and one or more processors coupled with the display, the audio sensor and the non-transitory memory (e.g., the electronic device 20 shown in FIGS. 1A-1E, and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes receiving, via the audio sensor, an audible signal and converting the audible signal to electronic signal data. For example, as shown in FIG. 2, the audio sensor 210 receives the audible signal 212 and converts the audible signal 212 to the electronic signal data 214. The electronic signal data can be stored in the non-transitory memory.

As represented by block 310a, in some implementations, the audible signal corresponds to an utterance by a user of the device. In some implementations, the audible signal corresponds to speech (e.g., spoken words or phrases) from the user of the device. For example, as shown in FIG. 1A, the audible signal 50 originates from the user 30.

As represented by block 310b, in some implementations, the audible signal is generated by the device and is output via a speaker of the device. For example, in some implementations, the electronic device 20 plays music or a video with sound.

As represented by block 310c, in some implementations, the audible signal is being output by another device. In some implementations, the audible signal is being output by a television, a speaker, a voice-activated device, etc. For example, as shown in FIG. 1E, the television represented by the XR television 152 outputs the audible signal.

As represented by block 320, in some implementations, the method 300 includes obtaining environmental data that indicates audio response characteristics of a physical environment in which the device is located. For example, as shown in FIG. 1B, the electronic device 20 obtains the environmental data 60 that indicates audio response characteristics of the physical environment 10. As another example, as shown in FIG. 2, the data obtainer 220 obtains the environmental data 222.

As represented by block 320a, in some implementations, obtaining the environmental data includes receiving the environmental data via an environmental sensor. In some implementations, the environmental sensor includes a depth sensor (e.g., a depth camera). In some implementations, the environmental sensor includes an image sensor (e.g., a camera). In some implementations, the environmental sensor includes the audio sensor that is used to receive the audible sensor.

As represented by block 320b, in some implementations, obtaining the environmental data includes capturing an image of the physical environment, and determining the audio response characteristics of the physical environment by performing a scene analysis of the physical environment. For example, as shown in FIG. 2, in some implementations, the environmental data 222 includes the image data 226 (e.g., a set of one or more images capturing the physical environment).

As represented by block 320c, in some implementations, obtaining the environmental data includes capturing depth data that indicates locations of physical obstructions in the physical environment. For example, as shown in FIG. 2, in some implementations, the environmental data 222 includes depth data 224. In some implementations, the physical obstructions include surfaces such as a floor, a ceiling and walls. In some implementations, the physical obstructions include furniture.

In some implementations, the method 300 includes determining the audio response characteristics of the physical environment based on material composition and physical dimensions of physical obstructions in the physical environment. In some implementations, the method 300 includes determining whether the physical obstructions reflect sound or absorb sound and to what extent.

In some implementations, the method 300 includes obtaining sound absorption coefficients or sound reflection coefficients of materials from which the physical obstructions are made. For example, as shown in FIG. 2, in some implementations, the environmental data 222 includes noise coefficients 228 (e.g., STC ratings or NRC values for various materials used in the physical environment).

As represented by block 320d, in some implementations, the method 300 includes receiving, via the audio sensor, another audible signal that represents an echo of the audible signal, and determining the audio response characteristics based on the echo. For example, in some implementations, the method 300 includes determining the audio response characteristics of the physical environment based on an amplitude of the echo. In some implementations, the method 300 includes determining the audio response characteristics of the physical environment based on an amount of time that passes between detecting the audible signal and detecting an echo of the audible signal.

As represented by block 330, in some implementations, the method 300 includes displaying, on the display, an indicator that indicates a distance from a source of the audible signal at which the audible signal is audible. In some implementations, the distance is based on an amplitude associated with the electronic signal data and the audio response characteristics of the physical environment. In some implementations, the distance represents a distance at which the audible signal is intelligible to a person. In some implementations, the distance represents a distance at which the audible signal is detectable by a device such as a voice-activated virtual assistant device.

In various implementations, displaying the indicator enhances a functionality of the electronic device by providing the user a visual indication of whether an amplitude of the audible signal needs to be decreased in order to prevent the audible signal from being audible in a particular portion of the physical environment. In various implementations, displaying the indicator enhances a functionality of the electronic device by providing the user a visual indication of whether an amplitude of the audible signal needs to be increased in order to allow the audible signal to be audible in a particular portion of the physical environment.

As represented by block 330a, in some implementations, the method 300 includes generating, based on the audio response characteristics of the physical environment, a sound propagation model that models propagation of audible signals in the physical environment. For example, as shown in FIG. 2, the sound propagation determiner 230 generates a sound propagation model 232 that models the propagation of the audible signal 212 in a physical environment. In some implementations, the method 300 includes providing an audio characteristic value (e.g., an amplitude value) associated with the electronic signal data as an input to the sound propagation model, and receiving the distance as an output of the sound propagation model.

As represented by block 330*b*, in some implementations, the distance indicates how far the audible signal is propagating from the source based on the amplitude of the audible signal and the audio response characteristics of the physical environment. For example, as shown in FIG. 1C, the indicator 70*a* indicates that the audible signal 50 is audible at a location that corresponds to the indicator 70*a*.

As represented by block 330*c*, in some implementations, the distance indicates how far from the source the audible signal can be heard by a person. In some implementations, the distance indicates how far the audible signal is intelligible by a person. For example, the distance indicates how far from the source of the audible signal the audible signal can be properly heard and comprehended by a person with average hearing abilities.

In some implementations, the indicator indicates whether or not the audible signal can be heard by a person located at the distance. For example, as shown in FIG. 1C, the indicator 70*a* indicates that the audible signal can be heard by the person 40 because the XR person 140 is on the concave side of the indicator 70*a* (e.g., the XR person is inside a bubble represented by the indicator 70*a*). However, the indicator 70*b* shown in FIG. 1D indicates that the audible signal 50 is inaudible to the person 40 because the XR person 140 is on the convex side of the indicator 70*b* (e.g., the XR person is outside a bubble represented by the indicator 70*b*).

As represented by block 330*d*, in some implementations, the distance indicates how far from the device the audible signal can be detected by a voice-activated device that can perform an operation in response to detecting the audible signal. In some implementations, the indicator indicates whether or not the audible signal can be detected by a voice-activated device located at the distance. As such, if the user is trying to activate the voice-activated device and the voice-activated device is not activating, the indicator indicates whether the user needs to speak louder in order to activate the voice-activated device.

As represented by block 330*e*, in some implementations, the indicator is sphere-shaped. In some implementations, the indicator is a bubble. For example, as shown in FIG. 1E, the electronic device 20 displays the bubble 170 to indicate how far an audible signal generated by the television is propagating in the XR environment 150.

In some implementations, the method 300 includes receiving, from a second device that includes a second audio sensor, an indication indicating whether the second audio sensor is receiving the audible signal. In some implementations, the method 300 further includes determining the distance based on the indication receiving from the second device.

In some implementations, the second device is located at the distance indicated by the indicator. In such implementations, if the second device indicates that the second device is able to detect the audible signal, displaying the indicator indicates that the audible signal is reaching the second device.

In some implementations, the second device is located at a second distance that is smaller than the distance indicated by the indicator. In such implementations, the device determines (e.g., estimates) how far the audible signal is propagating based on a strength (e.g., an amplitude) of the audible signal detected by the second device.

In some implementations, the distance is further based on a proximity of the device to the source of the audible signal. As such, in some implementations, the method 300 includes determining a position of the source of the audible signal relative to the device, and determining the distance at which the audible signal, generated by the source, is audible based on the relative position of the source. In some implementations, the amplitude associated with the electronic signal data is a function of a distance between the device and the source. For example, in some implementations, the amplitude is inversely proportional to the distance between the device and the source (e.g., the amplitude decreases as the distance between the device and the source increases, and the amplitude increases as the distance between the device and the source decreases).

FIG. 4A is a block diagram of a device 400 in accordance with some implementations. In some implementations, the device 400 implements the electronic device 20 shown in FIGS. 1A-1E, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 220, the sound propagation determiner 230, and the content presenter 240. In various implementations, the device 400 performs the method 300 shown in FIG. 3.

In some implementations, the data obtainer 220 obtains environmental data that indicates audio response characteristics of a physical environment. In some implementations, the data obtainer 220 performs the operation(s) represented by block 320 in FIG. 3. To that end, the data obtainer 220 includes instructions 220*a*, and heuristics and metadata 220*b*.

In some implementations, the sound propagation determiner 230 determines a distance from the device at which the audible signal is audible. To that end, the sound propagation determiner 230 includes instructions 230a, and heuristics and metadata 230b.

In some implementations, the content presenter 240 presents an indicator that indicates the distance determined by the sound propagation determiner 230. In some implementations, the sound propagation determiner 230 and the content presenter 240 collectively perform the operation(s) represented by block 330 shown in FIG. 3. To that end, the content presenter 240 includes instructions 240a, and heuristics and metadata 240b.

In some implementations, the one or more I/O devices 410 include an audio sensor (e.g., a microphone) for receiving an audible signal (e.g., the audible signal 50 shown in FIGS. 1A-1D, or the audible signal 212 shown in FIG. 2). In some implementations, the one or more I/O devices 410 include an image sensor (e.g., a camera) to capture the image data 226 shown in FIG. 2. In some implementations, the one or more I/O devices 410 include a depth sensor (e.g., a depth camera) to capture the depth data 224 shown in FIG. 2. In some implementations, the one or more I/O devices 410 include a display (e.g., the display 22 shown in FIG. 1B) for displaying an indicator (e.g., the indicator 70 shown in FIG. 1B, the indicator 70a shown in 1C, the indicator 70b shown in 1D, the bubble 170 shown in FIG. 1E, or the indicator 242 shown in FIG. 2). In some implementations, the one or more I/O devices 410 include a speaker for outputting an audible signal (e.g., the audible signal 50 shown in FIGS. 1A-1D, or the audible signal 212 shown in FIG. 2).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

FIG. 4B illustrates a blow-up view of an optical see-through display 420 in accordance with some implementations. In various implementations, the optical see-through display 420 includes a selectively occlusive layer 450 that includes a number of pixel elements that, when activated, block light from passing through the optical see-through display 420. Thus, through appropriate addressing of the selectively occlusive layer 450, the optical see-through display 420 can render a black region 451 or a gray region 452. In various implementations, the optical see-through display 420 includes a globally dimmable layer 460 that, according to a controllable dimming level, dims light passing through the optical see-through display 420. In various implementations, the globally dimmable layer 460 includes one or more of a photochromic element, electrochromic element, an SPD (suspended-particle device) element, GHLC (guest-host liquid crystal) element, or PDLC (polymer-dispersed liquid-crystal) element. In various implementations, the optical see-through display 420 includes a light addition layer 470 that includes a number of pixel elements that, when activated, emit light towards the user. Thus, through appropriate addressing of the light addition layer 470, the optical see-through display 420 can render a white (or colored) virtual object 471. In various implementations, the optical see-through display 420 does not include each of the layers 450, 460, 470. In particular, in various implementations, the optical see-through display 420 does not include the selectively occlusive layer 450 and/or the globally dimmable layer 460. In various implementations, the optical see-through display 420 does not include the light addition layer 470 and/or the globally dimmable layer 460. In various implementations, the optical see-through display 420 does not include the selectively occlusive layer 450 and/or the light addition layer 470.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, an audio sensor, a processor and a non-transitory memory:
        receiving, via the audio sensor, an audible signal and converting the audible signal to electronic signal data;
        obtaining environmental data that indicates audio response characteristics of a physical environment in which the device is located; and
        displaying, on the display, an indicator that indicates a distance from a source of the audible signal at which the audible signal is audible, wherein the distance is based on an amplitude associated with the electronic signal data and the audio response characteristics of the physical environment.
2. The method of claim 1, wherein obtaining the environmental data comprises receiving the environmental data via an environmental sensor.
3. The method of claim 1, wherein obtaining the environmental data comprises capturing an image of the physical environment and determining the audio response characteristics of the physical environment by performing a scene analysis of the physical environment.
4. The method of claim 1, wherein obtaining the environmental data comprises capturing depth data that indicates locations of physical obstructions in the physical environment.
5. The method of claim 4, further comprising determining the audio response characteristics of the physical environment based on material composition and physical dimensions of the physical obstructions in the physical environment.
6. The method of claim 5, further comprising obtaining sound absorption coefficients or sound reflection coefficients of materials from which the physical obstructions are made.
7. The method of claim 1, further comprising:
    receiving, via the audio sensor, another audible signal that represents an echo of the audible signal; and
    determining the audio response characteristics based on the echo.
8. The method of claim 1, further comprising generating, based on the audio response characteristics of the physical environment, a sound propagation model that models propagation of audible signals in the physical environment.
9. The method of claim 8, further comprising providing an audio characteristic value associated with the electronic signal data as an input to the sound propagation model, and receiving the distance as an output of the sound propagation model.
10. The method of claim 1, wherein the distance indicates how far the audible signal is propagating from the source based on the amplitude and the audio response characteristics.
11. The method of claim 1, wherein the distance indicates how far from the source the audible signal can be heard by a person.
12. The method of claim 1, wherein the indicator indicates whether or not the audible signal can be heard by a person located at the distance.
13. The method of claim 1, wherein the distance indicates how far from the source the audible signal can be detected by a voice-activated device that can perform an operation in response to detecting the audible signal.
14. The method of claim 1, wherein the indicator indicates whether or not the audible signal can be detected by a voice-activated device located at the distance.
15. The method of claim 1, wherein the indicator is sphere-shaped.
16. The method of claim 1, wherein the audible signal corresponds to an utterance by a user of the device.
17. The method of claim 1, wherein the audible signal is generated by the device and is output via a speaker of the device.
18. The method of claim 1, wherein the audible signal is being output by another device.
19. A non-transitory memory storing one or more programs, which, when executed by one or more processors of a device including an audio sensor and a display, cause the device to:
    receive, via the audio sensor, an audible signal and converting the audible signal to electronic signal data;
    obtain environmental data that indicates audio response characteristics of a physical environment in which the device is located; and
    display, on the display, an indicator that indicates a distance from a source of the audible signal at which the audible signal is audible, wherein the distance is based on an amplitude associated with the electronic signal data and the audio response characteristics of the physical environment.
20. A device comprising:
    an audio sensor;
    one or more processors;
    a non-transitory memory;
    one or more displays; and
    one or more programs stored in the non-transitory memory, which, when executed by the one or more processors, cause the device to:
        receive, via the audio sensor, an audible signal and convert the audible signal to electronic signal data;
        obtain environmental data that indicates audio response characteristics of a physical environment in which the device is located; and
        display, on the one or more displays, an indicator that indicates a distance from a source of the audible signal at which the audible signal is audible, wherein the distance is based on an amplitude associated with the electronic signal data and the audio response characteristics of the physical environment.

21. The non-transitory memory of claim 19, wherein obtaining the environmental data comprises capturing an image of the physical environment and determining the audio response characteristics of the physical environment by performing a scene analysis of the physical environment.

22. The non-transitory memory of claim 19, wherein obtaining the environmental data comprises capturing depth data that indicates locations of physical obstructions in the physical environment.

23. The non-transitory memory of claim 19, wherein the one or more programs further cause the device to:
   receive, via the audio sensor, another audible signal that represents an echo of the audible signal; and
   determine the audio response characteristics based on the echo.

24. The device of claim 20, wherein the one or more programs further cause the device to generate, based on the audio response characteristics of the physical environment, a sound propagation model that models propagation of audible signals in the physical environment.

25. The device of claim 20, wherein the distance indicates how far from the source the audible signal can be heard by a person.

\* \* \* \* \*